Figure 4:
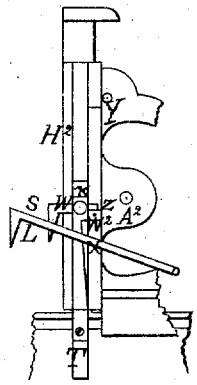

2 Sheets--Sheet 1.

D. LANE.

Improvement in Head Blocks for Saw Mills.

No. 4,764. Reissued Feb. 20, 1872.

Witnesses.
Villette Anderson
G. Anderson

Inventor,
Dennis Lane,
Chipman & Osmun & Co,
Attys.

AM. PHOTO-LITHOGRAPHIC CO. N.Y. (OSBORNE'S PROCESS.)

2 Sheets--Sheet 2.

D. LANE.

Improvement in Head Blocks for Saw Mills.

No. 4,764. Reissued Feb. 20, 1872.

*Witnesses.*
*Villette Anderson.*
*J. Anderson*

*Inventor.*
*Dennis Lane,*
*Chipman & Osmun & Co.*
*Attys.*

AM. PHOTO-LITHOGRAPHIC CO. N.Y. (OSBORNE'S PROCESS.)

UNITED STATES PATENT OFFICE.

DENNIS LANE, OF MONTPELIER, VERMONT.

IMPROVEMENT IN HEAD-BLOCKS FOR SAW-MILLS.

Specification forming part of Letters Patent No. 79,484, dated June 30, 1868; reissue No. 4,764, dated February 20, 1872.

Be it known that I, DENNIS LANE, of Montpelier, in the county of Washington and State of Vermont, have invented a new and valuable Improvement in Head-Blocks for Saw-Mills; and I do hereby declare that the following is a full, clear, and exact description of the same, reference being had to the annexed drawing making part of this specification.

The present invention consists, first, in providing either one or more of the head-blocks to a saw-mill carriage with rollers or wheels, in suitable position to run upon the carriage from end to end as the head-blocks are moved or slid along thereon, for adjustment with reference to the log, and in so arranging such rollers or wheels that they can be raised from or lowered to their bearing upon the carriage, according as the head-blocks are to remain stationary or to be adjusted in position, as above stated; second, in providing the head-blocks to a saw-mill carriage with scrapers, brushes, or other devices suitable for scraping or cleaning the carriage over and on which they run, (in advance of the movement of said blocks, whether in one or the other direction of the sawdust, &c., which may have accumulated or become deposited thereon in the running of the mill;) these scrapers, &c., are of much utility, and more especially when the head-blocks are provided with rollers, as in the first part of this invention; third, in providing the upright supports for the head-blocks with a dog or dogs that are arranged to move up and down thereon, being attached to and carried by a slide, and also to be swung clear back from the working or bearing face of the head-block, and by means of a slide-dog, arranged as above described, the log is "dogged" without danger of injury to the saw, as will be obvious from the detailed description to be hereinafter given of the same; fourth, in connecting the head-blocks, through a chain or line, with a mechanism so arranged as to cause the head-blocks to be moved back upon the carriage as such carriage is being run or "gigged" back, as it is termed, this mechanism being, however, of such arrangement as to allow of its being thrown out of or into action, according as it may be desired, and when in action, by automatically feeding or carrying back the head-blocks through the gigging back of the carriage, saving time and labor, as is obvious, in the running of a saw-mill.

Figure 1:
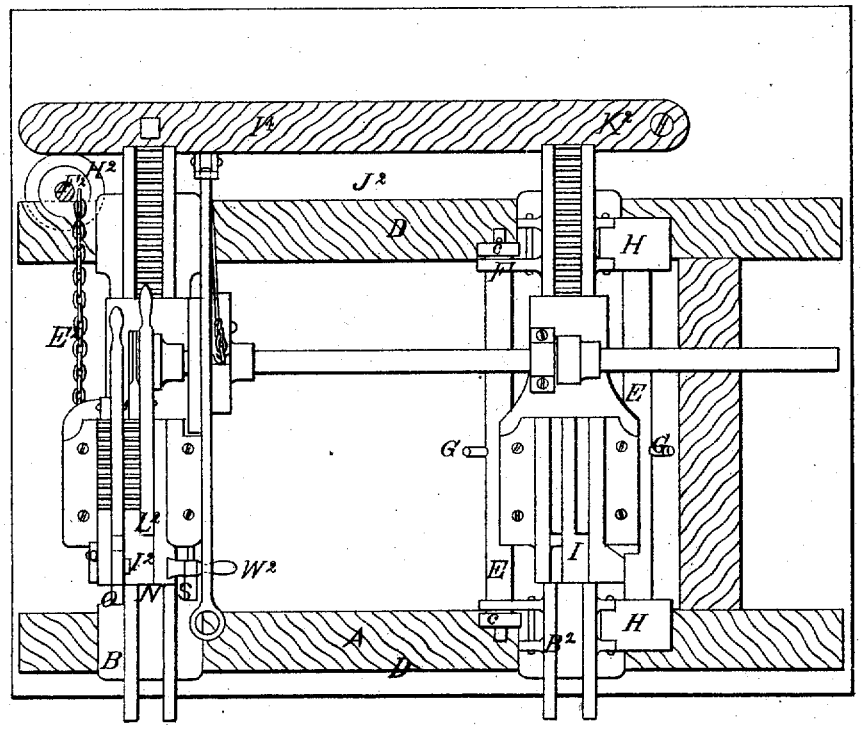
Figure 2:
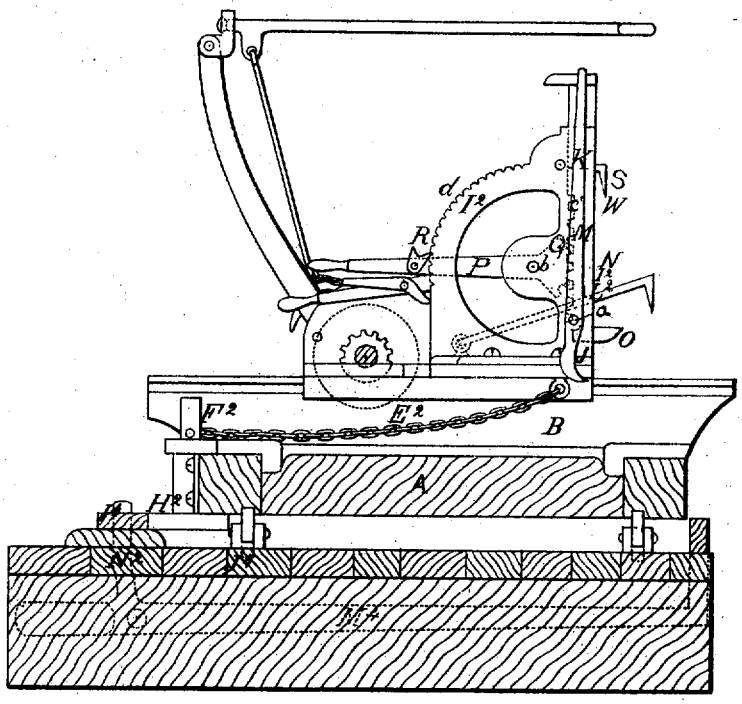
Figure 3:
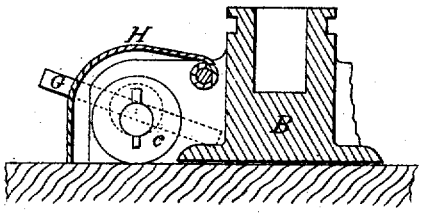

In the accompanying drawing, Figure 1 is a plan or top view of a saw-mill carriage and of a part of the bed in which it is arranged to travel; Fig. 2, a transverse vertical section of the carriage from the front to the rear side; Fig. 3, a sectional view through the carriage in the plane of the line *z z*, Fig. 1; Fig. 4, a view in detail of the slide-dog.

A in the drawing represents a saw-mill carriage, which may be of any of the usual forms and constructions; B $B^2$, head-blocks arranged on the carriage, the number of which may be either more or less, according to the length of the carriage across which they extend. One, $B^2$, of these head-blocks is shown as arranged to be moved upon the carriage in the direction of its length, and to this head-block, upon each side, rollers or wheels *c* are hung in position to bear or run upon the side bars or rails D to the carriage. These rollers, upon the same side of the head-blocks, are hung to the eccentric ends or portions of a common shaft, E, that is arranged to be turned in the ear-pieces F fixed to the side of the head-block. G, handles fixed to shafts E for convenience in turning them, and thus, by the eccentricity of their portions or ends, causing the rollers to be raised from or lowered to the carriage, according as it is desired that the head-blocks should rest directly upon the carriage—as, for instance, when set in position; or to throw the rollers or wheels upon the carriage—as, for instance, when the blocks are to be run along upon the carriage in either one or the other direction for being adjusted or brought to the proper position with reference to the length of the log to be sawed. By providing the head-blocks with rollers or wheels, as above described, it is plainly obvious greater ease and freedom of motion are obtained during adjustment, while when in position they can rest firmly and solidly upon the carriage-frame. H are scrapers, fixed to the side of the head-block and arranged thereon to extend over and cover the rollers or wheels *c*, and from thence down to the carriage, so as to scrape and clear the same in advance of the movement of the head-blocks, whether it be in either one or the other direction, of whatever sawdust, &c., may have accumulated thereon, which would otherwise, were it allowed to remain, serve to obstruct the movement of the blocks, as above stated. These scrapers in the present instance are shown as hinged to the head-blocks; but they may be rigidly fixed, if so desired, and in lieu of scrapers brushes may be employed for the same purpose, the same effect being accomplished in either case. The head-blocks B $B^2$ are shown as provided with upright supports or bearings I $I^2$, for the log to rest or bear against when placed upon the head-blocks for the purpose of being sawed, and one, $I^2$, of these upright supports is provided with an arrangement of dogs and a lifter, to be now described. J is a dog, hung by a pivot, *a*, to one side of the upright $I^2$. This dog J at one end terminates in a lever-handle, K, and at its other and lower end is so shaped or sharpened that it can be made to embed itself in a log upon its under side when properly operated by the lever-handle K, and thus hold the log from rolling over toward the uprights when the side face of the log along which the saw is cutting has been lightened by the cutting of boards and slabs from it. L is a dog of the ordinary and common form, hung to uprights and in position to catch and hold the log upon its upper side, this dog being competent to be used in connection with the dog J hereinbefore referred to, and provided for holding the log upon its under side. M is a slide, arranged to move in a vertical groove or way of the face N of the upright $I^2$, with which face it is flush, or nearly so. This slide at its lower end projects by a right-angular arm, O, beyond the face of the upright, this arm O, when the slide is in its lowest position, being below the surface of the head-block upon which the log rests, and thus in no manner obstructing the proper placing or disposition of a log upon them; but by this arm O, if the slide M be raised, the log can be lifted from the head-block, if found necessary, in order to prevent its obstructing the operation of the mill by coming in contact with the collar of the saw or any other working parts. For raising the slide or log-lifter M a lever-handle, P, is provided, which handle is hung upon a pivot or fulcrum, *b*, in the upright, and at its inner end is provided with a sector-gear, Q, that is engaged with the rack-teeth *c'* to the rear side of the slide or lifter M. R is a holding-pawl or lever, by which, when set in any one of the notches *d* in the rear side of the upright, the lifter can be held fast at any point desired. S is a dog arranged on an upright. This dog S is in two parts, T and W, the one, T, being a bar that is arranged to slide in a vertical way or groove of the upright, and the other, W, the dog proper, consisting of a bar pivoted at one end to the lower end of the slide-bar T, with its other and upper end provided with a prong, by which the dog can be engaged with a log, and arranged to pass or swing through the bent-over upper end of the slide bar T. $W^2$ represents a fulcrum or projection, attached to the dog S at a little above the level of the prong W and at right angles to the horizontal portion thereof, by means of which the prong can be raised out of the log by a lever or bar applied under the said fulcrum or projection $W^2$, the forward end of the lever resting on the log. The upper end of the dog S is provided with a shoulder, X, by which, when the dog is in its uppermost position, it can be made to rest and hang upon the rest or shoulder Y of the upright support, bringing the dog-hook or prong W beyond the face of the said upright. Z, a pin, fixed in the upper end of the dog, by which pin the dog, when in its lowest position, rests upon the shoulder or rest $A^2$ of the upright. With a dog, S, arranged as above described, as it moves in a fixed plane, it is plainly obvious that the log can be dogged, when somewhat reduced by the cutting of boards from it, without danger of injury to the saw as it is cutting through the log. In the upright shown as carrying the dogs L S and lifter M, a slide, $L^2$, is shown as arranged to be moved to project from the face of the upright, to throw out the log from the upright, to accommodate a taper form, or to bring the front side of the log in the proper position to cut off a slab. In the present instance the several head-blocks and upright supports are shown as arranged for operation in a manner similar to that described in the reissued Letters Patent granted to me on the 6th day of March, A. D. 1866, by which the upright supports are made to move in conjunction with each other, and in fact as if one, when properly operated; and it is therefore not deemed necessary to herein particularly describe such arrangement of parts. $E^2$ is a chain, hung at one end to one of the upright supports, from which it extends to the rear side of the carriage, where it is hung to the upper end of a vertical shaft, $F^2$, arranged to turn in bearings upon the rear side rail to the carriage. This shaft $F^2$, at its lower end, is provided with a friction-pulley, $H^2$, which is in position to run along and upon the side or edge of a bar, $I^4$, placed upon the floor $J^4$, of the mill. This bar $I^4$ is hung at one end, $K^2$, so as to be swung toward or away from the friction-pulley $H^2$, and thus in the first instance to bring its edge to bear thereon, and thereby, by producing a friction if the carriage is being gigged back, cause the shaft carrying the pulley to turn and wind upon it the connecting-chain between it and the upright supports, drawing them back upon the head-blocks, so as to prepare the blocks to receive another log. For operating the bar $I^4$ to bring it into position against the friction-pulley, or to release it therefrom, a treadle, $M^2$, is arranged under the flooring $J^4$, with one end in position at the front of the carriage to be trod upon for operating it, and at the other end connected with the bar $I^4$ through an upright, $N^2$. This treadle, at its rear or inner end, is weighted so that when the foot is released from it the treadle will automatically rise and thus release the bar from the friction-pulley. By means of the connection to the upright supports above described, as the carriage is being gigged back, if the bar is moved so as to bear upon the friction-pulley the said uprights can be thereby drawn back upon the head-blocks, either more or less, as may be desired. This arrangement is of much importance when a log has been completely sawed and a fresh log is to be placed upon the carriage, as it saves both time and labor in the running of a mill.

What I claim as my invention, and desire to secure by Letters Patent, is—

1. The combination of the carriage and head-block of a saw-mill with the eccentrically operating rollers *c*, substantially as specified.

2. The combination of the carriage and setting-up devices of a saw-mill with the friction-pulley $H^2$ and bearing $I^4$, for retracting the supports or setting-up devices automatically by the movement of the carriage, substantially as specified.

3. The combination, with the head-blocks and carriage, of the scrapers or brushes H, substantially as specified.

4. In combination with the lateral support or setting-up device of a saw-mill carriage, a vertically-sliding dog, S, having an adjustable, downwardly-projecting prong, W, and a projection, $W^2$, extending at right angles with the direction of the prong, substantially as specified.

5. The treadle $M^4$ and upright $N^2$, in combination with the bar $I^4$, substantially as and for the purpose specified.

In testimony that I claim the above I have hereunto subscribed my name in the presence of two witnesses.

DENNIS LANE.

Witnesses:
F. B. CURTIS,
P. C. MASI.